Figure 1:
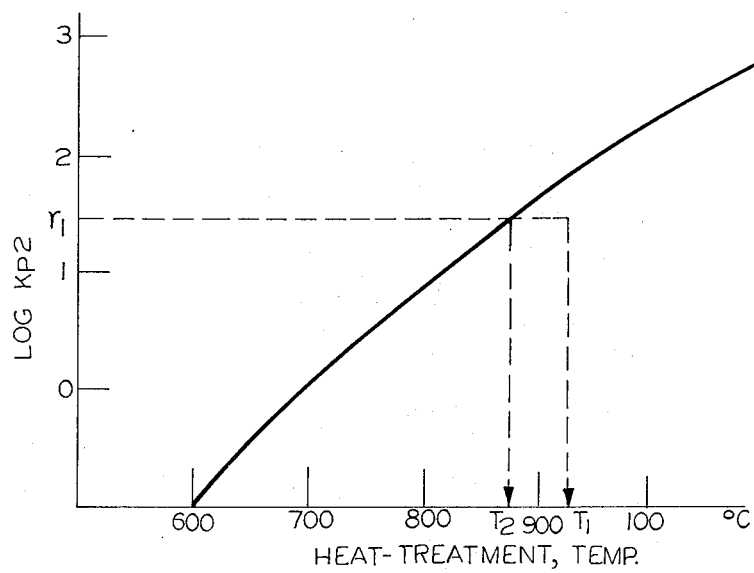

United States Patent
Yamagishi

[15] 3,693,409
[45] Sept. 26, 1972

[54] METHOD AND APPARATUS FOR MEASURING THE CARBON POTENTIAL IN GAS ATMOSPHERES

[72] Inventor: Kazuo Yamagishi, Urawa, Japan

[73] Assignee: Tokyo Gas Company Limited, Tokyo, Japan

[22] Filed: Oct. 12, 1970

[21] Appl. No.: 79,872

[52] U.S. Cl.............73/25, 23/254 E, 23/255 E, 148/16.5
[51] Int. Cl.............G01n 25/02
[58] Field of Search............73/23, 25, 17, 15, 19; 148/16.5, 148; 266/1 R; 23/253, 254 E, 255 E

[56] References Cited

UNITED STATES PATENTS

| | | | |
|---|---|---|---|
| 2,886,478 | 5/1959 | Beard | 148/16.5 |
| 2,934,941 | 5/1960 | Suitzer et al. | 73/23 |
| 3,581,554 | 6/1971 | Lafiae | 73/23 |

OTHER PUBLICATIONS

Fisher " Measuring & Regulating the C-Potential" Microtonic, 1966, Vol. 20, No. 3, pp. 313–315, Vol. 20, No. 4, pp. 401–403, Vol. 20, No. 5, pp. 501–502.

*Primary Examiner*—James J. Gill
*Assistant Examiner*—C. E. Snee, III
*Attorney*—Wenderoth, Lind & Ponack

[57] ABSTRACT

A method and apparatus for detecting the carbon potential of a gas atmosphere within a heat-treatment furnace. A sample of gas atmosphere is extracted from the furnace and while cooling it the carbon deposit temperature is measured by a measuring element having of a carbon deposit detecting tip and a thermocouple adapted to be inserted directly into the furnace to measure the carbon deposit temperature of the said gas atmosphere. A temperature control means is connected with the carbon deposit detecting tip for changing the temperature of said tip, and a recorder is connected with said thermocouple for recording the temperature at which the tip detects a carbon deposit. The internal temperature of the furnace is measured, and the thus measured temperature values are used to determine the carbon potential.

2 Claims, 3 Drawing Figures

METHOD AND APPARATUS FOR MEASURING THE CARBON POTENTIAL IN GAS ATMOSPHERES

This invention relates to a method of detection and control of the carbon potential in a gas atmosphere used in the non-decarburizing and non-carburizing heat treatment of carbon steel or the carburizing of low carbon steel.

Heretofor the carbon potential in a $CO-CO_2$ or $CO-H_2-CO_2-H_2O$ type gas atmosphere has been detected and controlled indirectly by detecting the $H_2O$ or $CO_2$ components individually, which components are the representative components of the said mixed gas. This is because, according to the classic theory relating to the reaction between iron and a mixed gas, it is believed that, in a gas atmosphere produced from gas of a certain composition, a certain stoichiometrical equilibrium is established between the constituent gases and the carbon potential of the mixed gas as a whole. The potential representing the chemical properties of the mixed gas with respect to the iron, can be determined by detecting one component of the said mixed gas.

However, a state of chemical equilibrium cannot be achieved in the furnaces being used for industrial purposes and, in the method carburization by the use of a carrier gas plus an enriching gas, or by the pyrolysis of heavier hydrocarbons (dripping carburization), the number of constituents of the gas atmosphere within the furnace is so great that the matter of carbon potential can be disposed of if at all, only by the simple classic chemical equilibrium theory relating to carburization.

Under such circumstances, it is a common practice, in the carburizing treatments presently conducted industrially, to obtain through experiments the interrelations between a representative component of the gas and the carbon potential in accordance with the type of furnace used, the quantity, shape and properties of the material to be treated, etc., and carry out the carburizing treatment relying upon the said interrelations, or to place a sample of the material in the furnace and determine the treatment conditions based on the result of carburizing treatment.

It is an object of the present invention to provide a method and apparatus by which the carbon potential in a carburizing gas atmosphere can be measured more directly and controlled more accurately and rapidly than by the method heretofore employed which depends on a representative component of the gas atmosphere, whereby the carburizing treatment can be drastically rationalized.

There is known a method of direct measuring of the carbon potential of a gas atmosphere, which comprises inserting and iron wire into a furnace and detecting the change in electrical resistance caused by the change in the carbon concentration in the said wire. However, this method is being employed in only a few cases for industrial purposes, because of the rapid deterioration of the iron wire and the measurement error likely caused by the extremely small absolute value of the resistance change.

It is a further object of the present invention to provide a method of directly measuring the carbon potential in a carburizing gas atmosphere which avoids the drawback of rapid deterioration of the measuring means.

Figure 2:
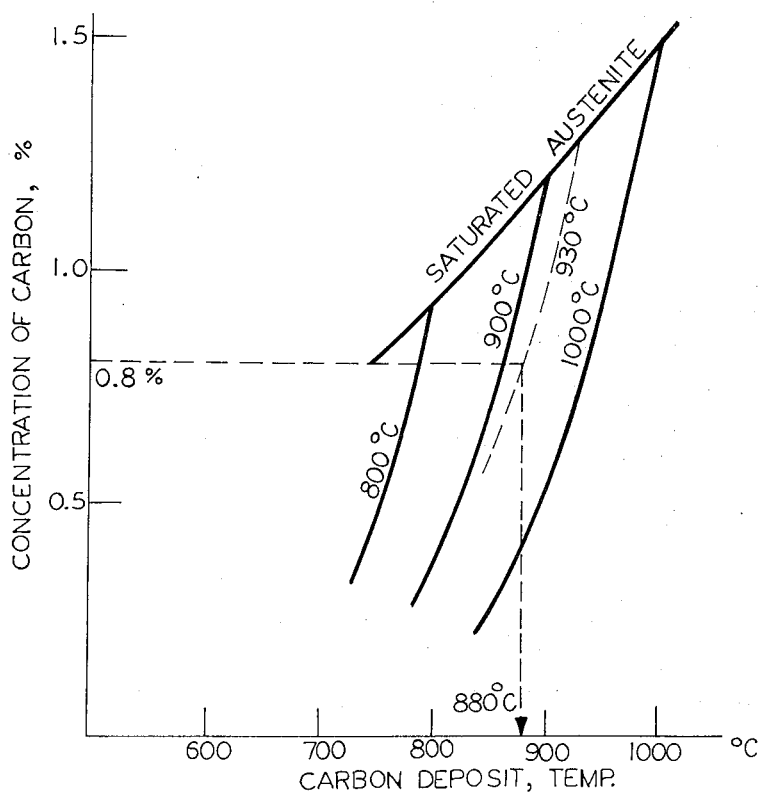
Figure 3:
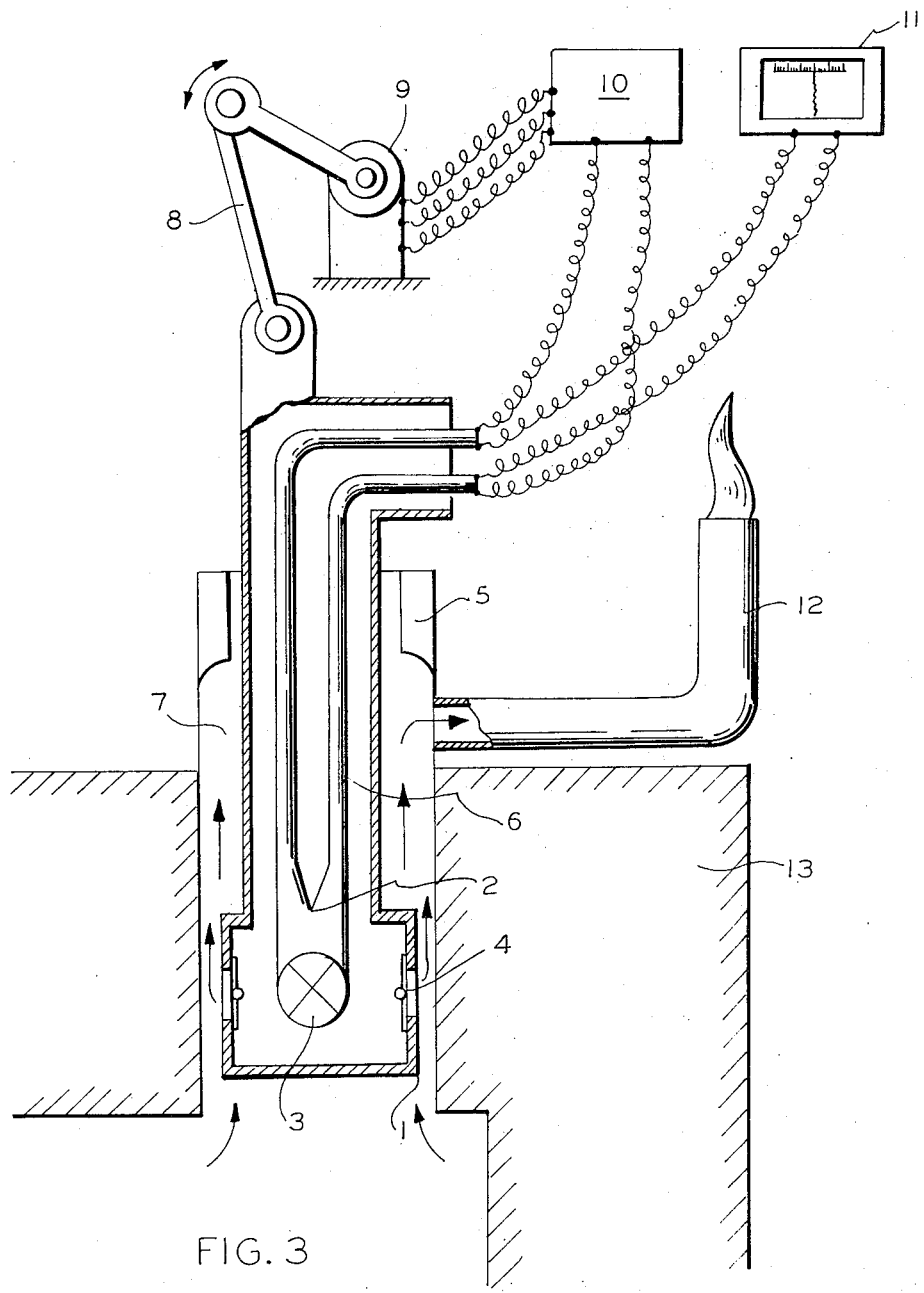

The present invention will be described in detail hereinafter, with reference to the accompanying drawings, in which:

FIGS. 1 and 2 are graphs for explaining the principle of the present invention, and FIG. 3 is a schematic illustration showing an embodiment of an apparatus according to the present invention.

First of all, the method according to the present invention will be explained in relation to the classic theory relating to carburization. For simplicity of the explanation, it will be limited to a gas atmosphere composed only two component gases, i.e. CO and $CO_2$. (The explanation to be given hereinafter is applicable in exactly the same way to a $CO-H_2-CO_2-H_2O$ mixture which is commonly used for industrial purposes.) In this case, the reaction between the mixed gas and the carbon in the high temperature steel ($\gamma$-steel) is represented by the following formula:

$$C(\gamma-Fe) + CO_2 \rightleftharpoons 2CO$$

The equilibrium constant $K_{p1}$ for this formula can be represented by:

$$K_{pl} = (P_{CO})^2/(P_{CO_2})A_c = r/A_c \qquad (1)$$

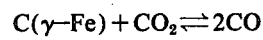

wherein $P_{CO}$ and $P_{CO_2}$ are the partial pressures of CO and $CO_2$ respectively and Ac is the activity of the carbon in the $\gamma-Fe$.

Other than the formula mentioned above, the following reaction is considered to occur between the $CO-CO_2$ mixed gas and carbon in the form of graphite:

$$C(\text{graphite}) + CO_2 \rightleftharpoons 2CO$$

$$K_{p2} = (P_{CO})/P_{CO_2} \qquad (2)$$

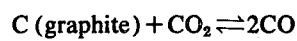

Since formulae (1) and (2) represent the same reaction with respect to the carbon, it can be said that $K_{p1} = K_{p2}$. Therefore $$r/Ac = K_{p2} \text{ and, hence, } Ac = r/K_{p2}$$

Here, the value of $K_{p2}$ can be obtained from the thermodynamic data, and the relationship between Ac and the carbon concentration in the iron is known. Therefore, if the partial pressure ratio $r$ of the component gases is known, the carbon potential of the gas atmosphere can be determined.

The method according to the present invention is to determine the value of $r$ directly. The value of $r$ can be obtained by calculation by analyzing the component gases. However, this necessitates a number of pieces of analyzing equipment. Even then good accuracy of the value can not be expected to be obtained due to errors involved in the measurement. So the following procedure is employed. Let is be assumed that the partial pressure ratio $r$ of the component gases of the gas atmosphere i.e. $(P_{CO})^2/(P_{CO_2})$, is $r1$ at a heat treatment temperature of $T_1$. When the gas temperature is continuously lowered, the gas starts to deposit carbon at a certain temperature $T_2$. The value of $r1$ can then be obtained from $T_2$. (The value of $r1$ varies slightly with falling temperature but such deviation can be ignored as being negligible.) At the point when the deposit of carbon has occurred, it can be considered that the gas atmosphere and the carbon are in equilibrium, and the value of $r1$ can be considered to be the value of $\bar{K}_{p2}$ corresponding to $T_2$ as taken from the equilibrium curve (FIG. 1) for C(graphite) $CO_2 \rightleftharpoons 2CO$. Once the value of $r$ of the gas temperature has been obtained in the manner described, the carbon potential can be determined from the well known relationship between $r$ and the carbon potential at each heat treatment temperature Rodney P. Smith, Equilibrium Iron-Carbon Alloys etc., 68 Journal of American Chemical Society 1167 (1946) For instance, for maintaining the carbon potential at a level of 0.8 percent at a heat treatment temperature of 930°C., the value of $r$ is 25.4 and the carbon deposit temperature corresponding thereto is 880° C., the dotted line in FIG. 1. FIG. 2 shows the relationship between the carbon deposit temperature and the carbon potential, using the heat treatment temperature as a parameter, in which the above-described example is indicated by the dotted line.

The method of determining the carbon potential according to the present invention has been described hereinabove by an equilibrium theory, with reference to the most simple gas atmosphere which consists of CO and $CO_2$. In a practical heat treatment, however, a deviation from the equilibrium state must, needless to say, be taken into account. Furthermore, where the carburization is effected by adding hydrocarbons directly into a furnace, the presence of one or more unsaturated carbon compounds must also be taken into account, in addition to such simple component gases as $CO_2$ and $H_2$. It is therefore impossible to generally define the relationship between the carbon deposit temperature and the carbon potential at a specific heat treatment temperature, but it occasionally becomes necessary to depend on an accumulation of experimental data to some extent, as in the case of the method in which the carbon potential is measured from a representative component gas. Nevertheless, according to the present invention the state of the gas atmosphere at a specific heat-treatment temperature at which $\gamma$-iron is saturated with carbon can be clearly detected by the fact that the carbon deposit temperature and the heat-treatment temperature becomes equal, and the carbon potential below the saturation concentration is obviously always in the proportion of 1 to 1 with respect to the carbon deposit temperature below the heat-treatment temperature, irrespective of the component gases. This is an important feature of the subject method, which is not possessed by any other method. In the conventional method in which the carbon potential is detected from one representative component gas in a gas atmosphere, the quantities of the specific gas corresponding to the saturation concentration and lower concentrations of carbon relative to $\gamma$-iron must all be determined through experiments in accordance with the other component gases and the conditions in the furnace.

In a practical heat treatment, such as carburization, the deposit of carbon within a furnace causes various troubles. In this respect, the method of this invention has a great advantage because, by employing the method, the temperature at which gas begins to deposit carbon can be detected clearly and hence such troubles can be avoided.

It is also to be noted that, in practicing the method of this invention industrially, the carbon potential can be measured when the temperature of a given gas atmosphere is in the range from the heat-treatment temperature to within 100° C. so that it is possible to measure the carbon potential directly in the furnace, instead of leading the gas atmosphere outside the furnace.

FIG. 3 shows an apparatus for practicing the method of this invention. In the arrangement shown, a carbon potential measuring element is mounted for vertical movement though the wall 13 of a heat-treatment furnace. By mounting the element in this way it is possible to change the temperature of the said element freely from the heat-treatment temperature on the inside surface of the furnace wall to room temperature on the outside surface of the same. Furthermore, an annular space 7 is provided around the element for the passage of gases there through, so as to ensure sufficient contact of the element with the gas atmosphere within the furnace.

In the arrangement of FIG. 3, there is provided a measuring element 1 having holes 4 formed in the wall thereof for introducing the gas atmosphere into measuring element 1. A thermocouple is provided to measure the temperature of the said element. A carbon deposit detecting tip 3 normally consisting of a pair of opposed electrodes is position inside the lower end of the measuring element adjacent the holes 4. These two electrodes are electrically connected with each other when a deposit of carbon occurs, thereby emitting an "ON" signal, and are electrically disconnected when the carbon deposit is removed, thereby emitting an "OFF" signal. These signals are sent to an element control motor 9 according to the signal received. Namely, when the "ON" signal is received, the element control device 10 causes the control motor 9 to rotate in the normal direction to move the measuring element 1 downwardly, whereas when the "OFF" signal is received, it causes the control motor 9 to rotate in the opposite direction to move the measuring element upwardly. Thus, the measuring element 1 is maintained at a temperature just equal to the carbon deposit temperature of the gas atmosphere. This temperature is detected by the thermocouple 2 and recorded by a recorder 11. Thus, it is possible to know the carbon potential. For controlling the carbon potential, it is only necessary to incorporate a regulating mechanism in the recorder 11, setting a desired value in the said regulating mechanism and controlling the operational quantity (e.g. the quantity of gas to be added, in the case of carburization) in accordance with a deviation of an input value from the said set value.

In FIG. 3, reference numeral 5 designates a water-cooled guide for the measuring element 1, 6 designates a support tube for the measuring element 1 which is movable in the vertical direction while being guided by the said guide 5, and 8 designates a linkage operatively connecting the said support tube 6 with the control motor 9. Reference number 12 designates an exhaust pipe through which the gases within the furnace are discharged to the outside as indicated by the arrows depicted in the Figure, while sufficiently contacting the measuring element 1.

It should be noted that although the above description has dealt with an arrangement for measuring the carbon potential within the furnace by taking advantage of the temperature gradient in the furnace wall, it is of course possible to measure the carbon potential by leading the gases to the outside of the furnace and heating the gases and the measuring element to the carbon deposit temperature using suitable heating means. However, the method of the embodiment described and illustrated herein is advantageous in that the necessity for cooling the gas atmosphere to a low temperature can be eliminated and hence an error which would result from a composition change during the cooling process can be avoided.

What is claimed is:

1. A method of detecting the carbon potential of a gas atmosphere within a heat-treatment furnace, comprising extracting a sample of gas atmosphere from the furnace and while cooling it directly measuring the carbon deposit temperature of the said gas atmosphere to determine the partial pressure ratio r, measuring the internal temperature of the said furnace, and correlating the thus measured temperature with the known relationship between r and the carbon potential to determine the carbon potential.

2. An apparatus for detecting the carbon potential of a gas atmosphere within a heat-treatment furnace, comprising a measuring element consisting of a carbon deposit detecting tip and a thermocouple adapted to be inserted directly into the furnace to measure the carbon deposit temperature of the said gas atmosphere, and temperature control means connected with said carbon deposit detecting tip for maintaining said carbon deposit detecting tip at the carbon deposit temperature whereby said thermocouple measures the carbon deposit temperature.

* * * * *